United States Patent
Do et al.

(10) Patent No.: US 8,349,484 B2
(45) Date of Patent: Jan. 8, 2013

(54) STACKING METHOD OF HIGH POWER LITHIUM BATTERY

(75) Inventors: Yurim Do, Seoul (KR); Jeonkeun Oh, Seoul (KR); Jae-Myoung Lee, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 275 days.

(21) Appl. No.: 12/602,882

(22) PCT Filed: May 15, 2008

(86) PCT No.: PCT/KR2008/002717
§ 371 (c)(1),
(2), (4) Date: Feb. 23, 2010

(87) PCT Pub. No.: WO2008/150070
PCT Pub. Date: Dec. 11, 2008

(65) Prior Publication Data
US 2010/0175245 A1 Jul. 15, 2010

(30) Foreign Application Priority Data
Jun. 4, 2007 (KR) ......................... 10-2007-0054407

(51) Int. Cl.
*H01M 10/38* (2006.01)
(52) U.S. Cl. .................... 429/149; 429/152; 429/129
(58) Field of Classification Search .................. 429/149, 429/152, 129
See application file for complete search history.

(56) References Cited

U.S. PATENT DOCUMENTS 7,981,548 B2 * 7/2011 Mimura ........................ 429/233
2007/0072083 A1 * 3/2007 Ikuta et al. .................... 429/246

FOREIGN PATENT DOCUMENTS

| JP | 1-292760 | 11/1989 |
|---|---|---|
| JP | 1-292761 | 11/1989 |
| JP | 2002-520803 | 7/2002 |
| KR | 1998-073911 | 11/1998 |
| KR | 2001-0111617 | 12/2001 |
| KR | 10-2002-0086858 A | 11/2002 |
| KR | 10-2001-0104150 A | 12/2002 |
| KR | 10-2003-0008512 A | 1/2003 |
| KR | 2003-0060324 | 7/2003 |

OTHER PUBLICATIONS

International Search Report from Korea in International Application No. PCT/KR2008/002717, mailed Jun. 17, 2008.

* cited by examiner

*Primary Examiner* — Jane Rhee
(74) *Attorney, Agent, or Firm* — Finnegan, Henderson, Farabow, Garrett & Dunner, LLP

(57) ABSTRACT

The present invention relates to a process for stacking a high-power lithium battery, and the object of the present invention is to provide a process for stacking a high-power lithium battery, with lowered the error rate and minimized open circuit voltage drop of the battery. The process for stacking a high-power lithium battery according to the present invention is characterized by a process for preparing a lithium battery comprised of anodes (100), separators (300) and cathodes (200), which comprises the steps of a) providing the anode (100) attached to the separator (300); b) providing the cathode (200) attached to the separator (300); and c) alternately stacking the anodes (100) attached to the separator (300) and the cathodes (200) attached to the separator (300) to form a stack cell.

11 Claims, 5 Drawing Sheets

STACKING METHOD OF HIGH POWER LITHIUM BATTERY

TECHNICAL FIELD

The present invention relates to a stacking method of high power lithium battery which lowers the error rate and minimizes the problem of dropping of Open Circuit Voltage (OCV) drop.

Conventionally, secondary batteries enabling recharge and discharge, being different from primary batteries, have been researched with development of high-tech industries such as digital cameras, cellular phone, lap-top computers, hybrid automobiles, or the like. Secondary batteries include nickel-cadmium batteries, nickel-metal hydride batteries, nickel-hydrogen batteries, secondary lithium batteries. Among them, secondary lithium batteries, having the operation voltage of 3.6 V or more, are employed as power source of portable electronic devices, or they are connected in series and used for hybrid automobiles of high power. Lithium batteries have operation voltage being three times as high as that of nickel-cadmium batteries or nickel-metal hydride batteries, and excellent energy density property per unit weight. Thus the use is abruptly increasing.

BACKGROUND ART

FIG. 1 shows a model of operative principle of a common lithium battery. Conventionally, lithium cobaltate is used as a cathode, while carbon material is used as an anode. Both have layered structure, and the recharge/discharge reaction is carried out by migration of lithium ions between the cathode and the anode. The reaction formulas are expressed as follows:

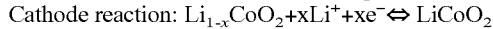
Cathode reaction: $Li_{1-x}CoO_2 + xLi^+ + xe^- \Leftrightarrow LiCoO_2$
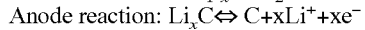
Anode reaction: $Li_xC \Leftrightarrow C + xLi^+ + xe^-$
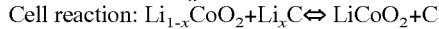
Cell reaction: $Li_{1-x}CoO_2 + Li_xC \Leftrightarrow LiCoO_2 + C$ As a separator, macroporous film of polyethylene or polypropylene is commonly used. Electrolyte solution means solute (as ion source) dissolved in organic solvent. However, the electrolyte solution for a lithium battery has different in some degree meaning from that for other batteries in that lithium ion should be treated harmoniously and broadly. Propylene carbonate or ethylene carbonate may be used as the organic solvent for lithium batteries, and lithium phosphate as the solute.

Lithium batteries are essentially manufactured stacking the cathodes, separators and anodes (made of the material as mentioned above) by sequentially. If the alignment is deteriorated even at a minute level during the stacking of the cathodes, separators and anodes having a certain standard, inferior goods may be found during the test stage after complete manufacture of the batteries, or open circuit voltage drop may occur during the course of recharge or discharge after the test.

Researches and developments have continually performed in order to solve such an alignment problem during the preparation of lithium batteries. Korean Patent Registration No. 0365824 (entitled "Secondary lithium ion batteries," hereinafter, referred to as "Prior Art (1)") discloses a manufacturing technique which comprises integrating a separator on an electrode plate in a pocketing manner, and stacking. Japanese Patent Laid-Open No. 2002-520803 (entitled "Secondary lithium batteries," here-in-after, referred to as "Prior Art (2)") discloses a process for aligning electrodes by forming hole patterns on subsidiary electrode material and primary electrode material in order to secure the electrodes by means of polymeric material penetrating the holes.

According to Prior Art (1), there may a concern that the electrode is placed at a bad angle in the separator formed as a pocket type, so that the problem of erroneous alignment of electrodes can be hardly solved. According to Prior Art (2) the problem of erroneous alignment can be overcome by forming holes on the electrodes, but the area for chemical reaction is lost because of these holes to result in poor performance of the battery.

DISCLOSURE

Technical Problem

The present invention is to overcome the problems of conventional techniques as described above. The object of the present invention is to provide a process for stacking a high-power lithium battery with exact alignment of cathodes, separators and anodes to lower the error rate and minimize the open circuit voltage drop of the battery.

Technical Solution

The process for stacking a high-power lithium battery in order to achieve the object mentioned above is characterized by a stacking method for preparing a lithium battery comprised of anodes (100), separators (300) and cathodes (200), which comprises the steps of a) providing the anode (100) attached on the separator (300); b) providing the cathode (200) attached on the separator (300); c) alternately stacking the cathode (200) attached on the separator (300) and the anode (100) attached on the separator (300) to form a stack cell.

The invention is characterized in that step a) comprises the steps of a-1) attaching adhesive material to the area of one side of the anode (100) [the anode (100) is comprised of a first metal film (120) which was cut in a predetermined dimension and then coated with a first lubricant material (110) on parts of both sides] where the first lubricant material (110) was not coated; a-2) attaching the anode (100) with adhesive material attached, to the separator (300) at a predetermined interval; and a-3) cutting the separator (300) with the anode (100) attached, in a predetermined dimension. It is also characterized in that the first metal film (120) is made of copper.

The process according to the invention is characterized in that step b) comprises the steps of b-1) attaching adhesive material to the area of one side of the cathode (200) [the cathode (200) is comprised of a second metal film (220) which was cut in a predetermined dimension and then coated with a second lubricant material (210) on parts of both sides] where the second lubricant material (210) was not coated; b-2) attaching the cathode (200) with adhesive material attached, to the separator (300) at a predetermined interval; and b-3) cutting the separator (300) with the cathode (200) attached, in a predetermined dimension. It is characterized in that the second metal film (220) is made of aluminum.

The process according to the invention is characterized in that step c) comprises the steps of c-1) attaching the adhesive material to the side of anode (100) uncoated with the first lubricant material; the side of anode (100) attached to the separator (300), which was not coated with the first lubricant material (110); and the side of cathode (200) attached to the separator (300), which was not coated with the second lubricant material (210); and c-2) placing at the bottom the anode (100) with the adhesive material attached, and alternately stacking the cathodes (200) attached to the separator (300) and the anodes (100) attached to the separator (100) to form a stack cell.

It is characterized in that the adhesive material is adhesive means including an adhesive agent or adhesive tape.

It is also characterized in that the cutting stages of a-3) and b-3) use heat cutting.

Advantageous Effects

According to the present invention, anodes, separators and cathodes can be exactly aligned during manufacturing of batteries, and thus the error rate of lithium batteries can be minimized. In addition, due to exact alignment of the) constituents of a battery, the open circuit voltage drop is minimized.

DESCRIPTION OF SYMBOLS OF SIGNIFICANT PARTS OF THE DRAWINGS

Figure 1:
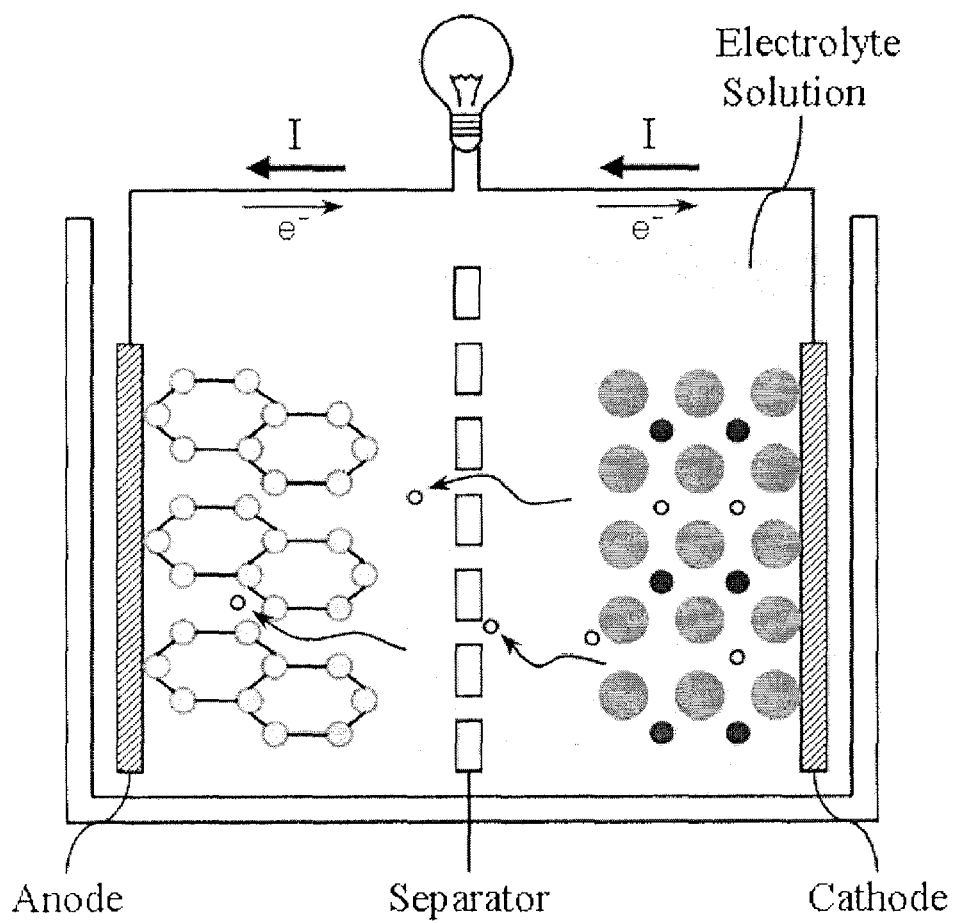
FIG. 1 shows the model of operation principle of conventional lithium batteries.

100: anode
200: cathode
110: first lubricant material
210: second lubricant material
120: first metal film
220: second metal film
300: separator

BEST MODE

Now the process for stacking a high-power lithium battery having the constitution described above according to the present invention is described in more detail by referring to accompanying drawings.

Figure 2:
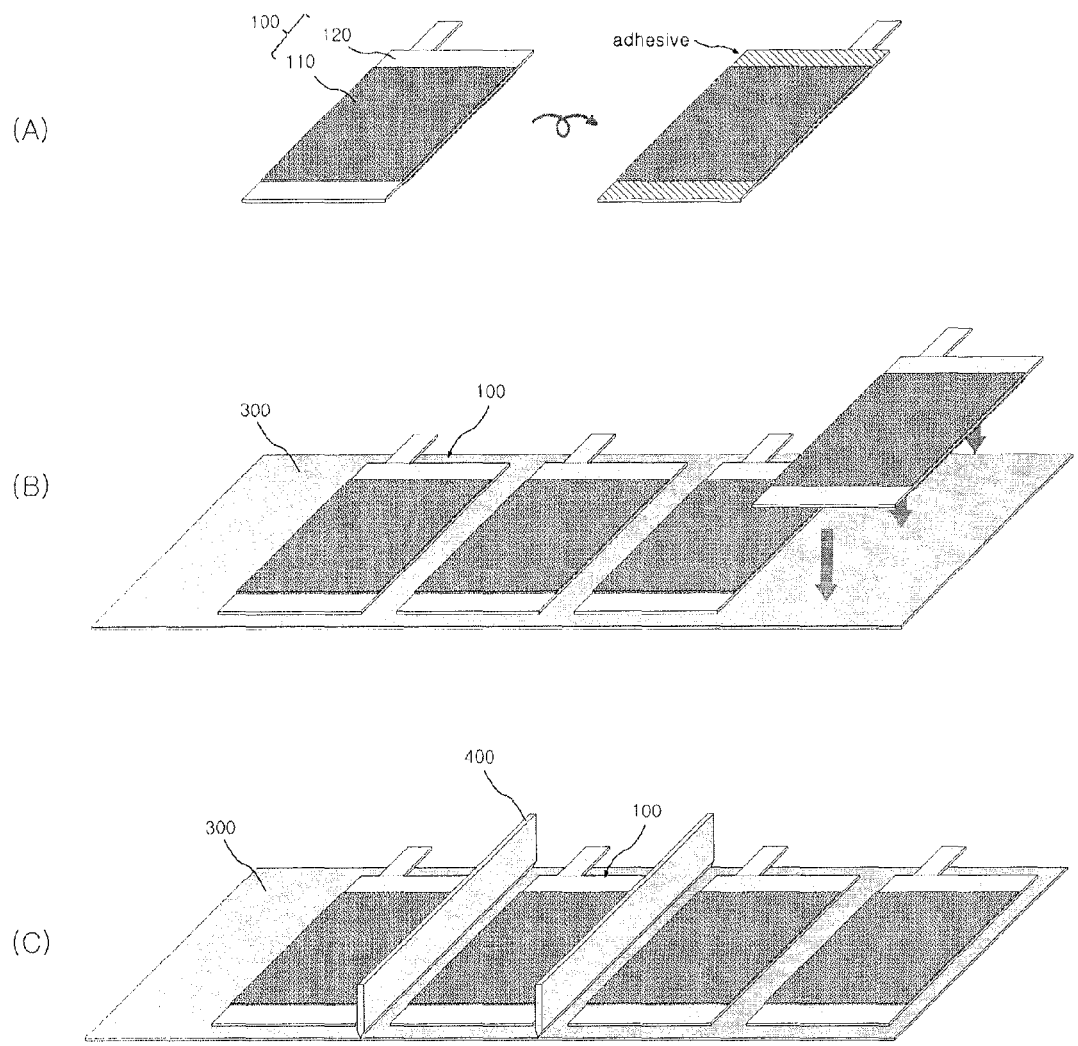
FIG. 2 shows the stage of preparing an anode according to the present invention.

FIG. 2 shows the stage of preparing an anode according to the invention. The anode (100) is prepared by coating a first lubricant material (110) on both sides of a first metal film (120) cut in a predetermined dimension. The first lubricant material (110) is not coated on the overall area of first metal film (120), but coated on the film remaining the part of the edge uncoated, as shown in FIG. 2(A). The first metal film (120) is preferably made of copper.

The edge portion which was not coated with the first lubricant material (110) on one side of the anode (100) is shown as the area of oblique lines in FIG. 2(A). To this area, adhesive material is attached as illustrated by FIG. 2(A). The stage of attaching the adhesive material may be carried out by applying adhesives such as glue or starch, or by using adhesive means such as adhesive tape.

Thus, the anode (100) wherein adhesive material was attached to the edge of one side is attached by placing it on the separator (300) with predetermined intervals, as illustrated by FIG. 2(B). Then, the separator (300) with the anode (100) attached thereto is cut by a cutter (400) in predetermined intervals. The cutter (400) preferably employs heat cutting.

According to the present invention, anodes (100) attached on separators (300) are previously prepared through the stage as described above.

Figure 3:
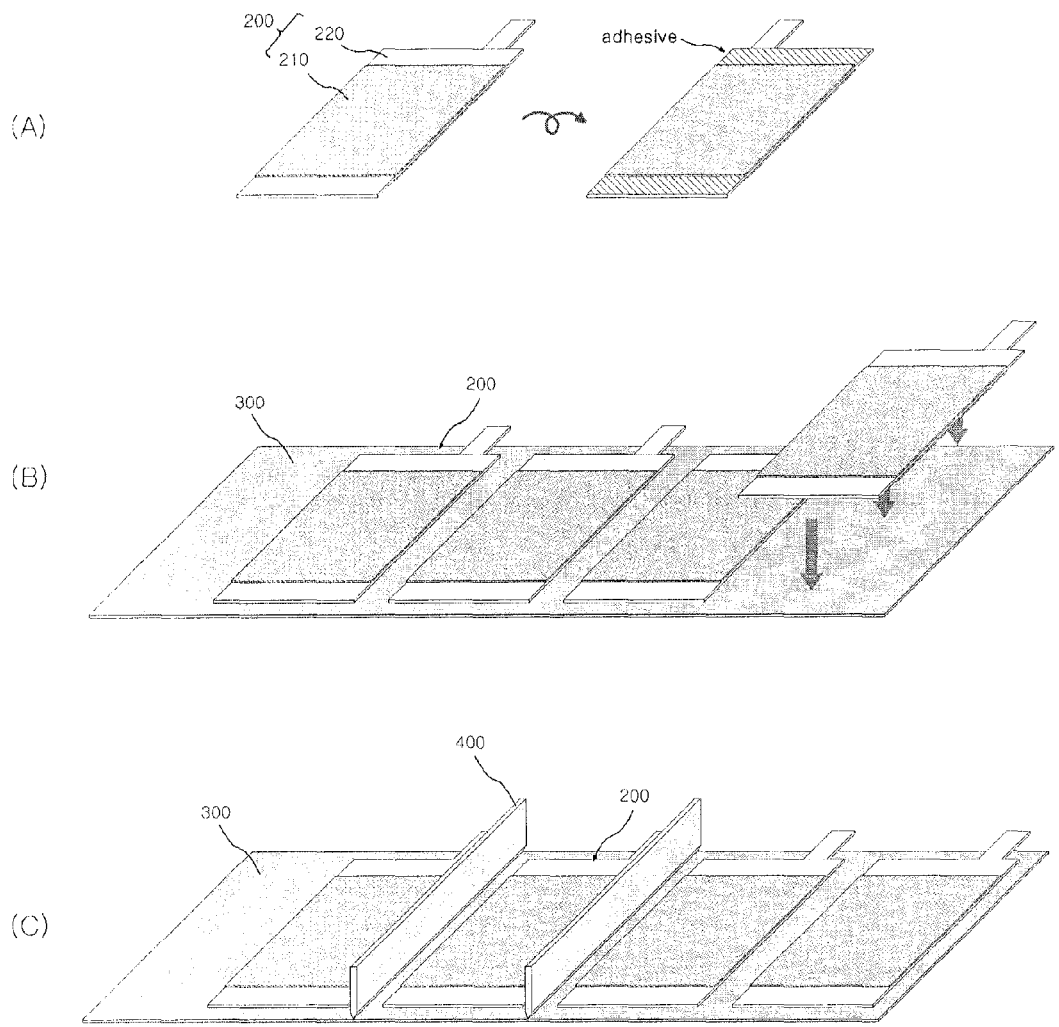
FIG. 3 shows the stage of preparing a cathode according to the present invention.

FIG. 3 is a stage for preparing a cathode according to the invention, being very similar to that of an anode. The cathode (200) is prepared by coating a second lubricant material (210) on both sides of a second metal film (220) cut in a predetermined dimension. The second lubricant material (210) is not coated on the overall area of second metal film (220), likewise, but coated on the film remaining the part of the edge uncoated, as shown in FIG. 3(A). The second metal film (220) is preferably made of aluminum.

The edge portion which was not coated with the second lubricant material (210) on one side of the cathode (200) is shown as the area of oblique lines in FIG. 3(A). To this area, adhesive material is attached as illustrated by FIG. 3(A). The stage of attaching the adhesive material may be carried out, being identical to the stage in preparing the anode, by applying adhesives such as glue or starch, or by using adhesive means such as adhesive tape.

Thus, the cathode (200) wherein adhesive material was attached to the edge of one side is attached by placing it on the separator (300) with predetermined intervals, as illustrated by FIG. 3(B). Then, the separator (300) with the cathode (200) attached thereto is cut by a cutter (400) in predetermined intervals. The cutter (400) preferably employs heat cutting.

According to the present invention, cathodes (200) attached on separators (300) are previously prepared through the stage as described above.

Figure 4:
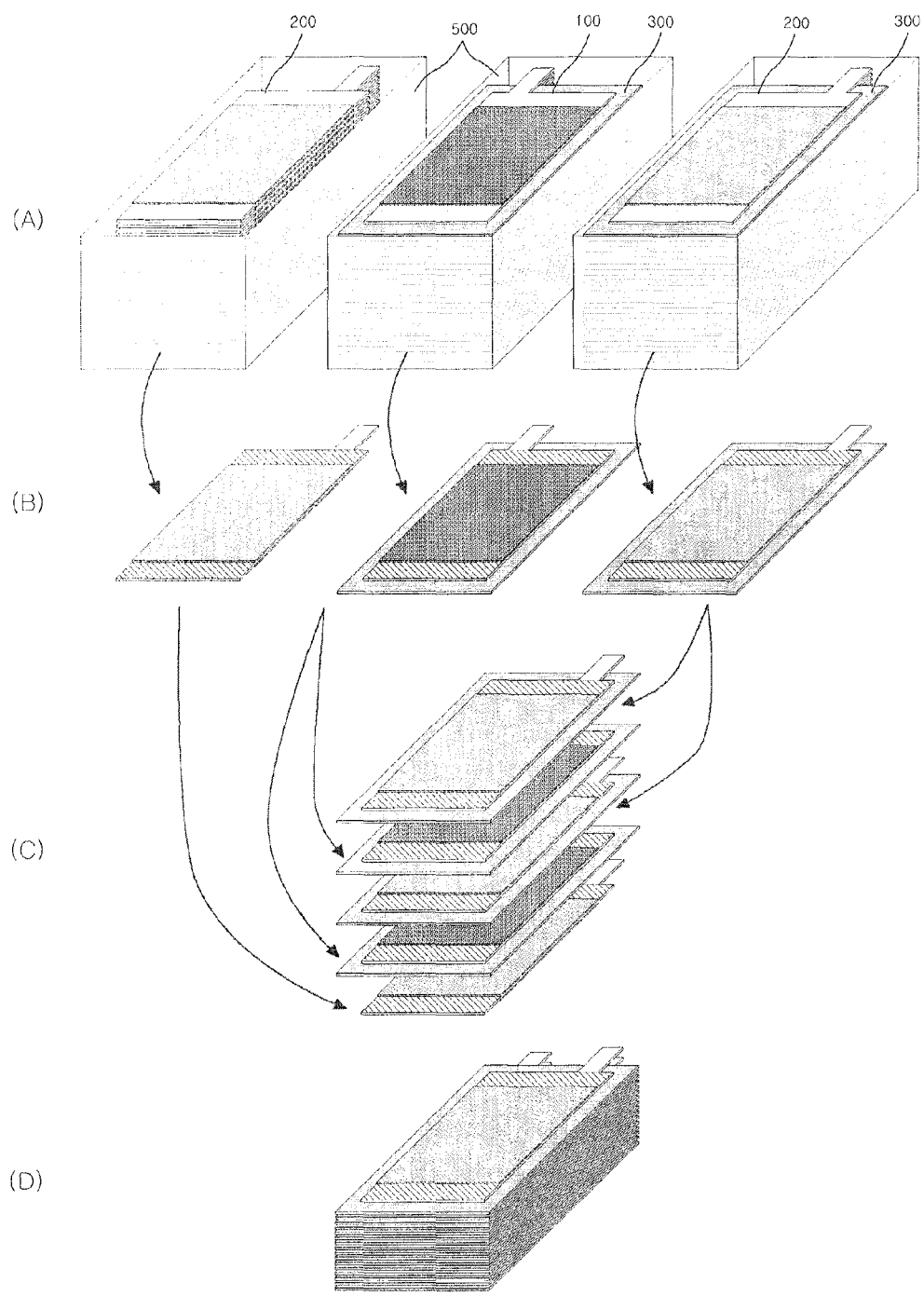
FIG. 4 shows the stage of stacking a lithium battery according to the present invention.

FIG. 4 shows the stage of stacking lithium batteries according to the present invention. The separator (300) with the anode (100) attached via the stage illustrated by FIG. 2, and the separator (300) with the cathode (200) attached via the stage illustrated by FIG. 3 are stacked as illustrated by FIG. 4(A), and stored in a cartridge (500). The anode (100) which was not attached to the separator (300) is separately stored in a cartridge.

Then, to the areas uncoated with the lubricant material (110, 210), on the anode (100), the cathode (200) attached to the separator (300), and the anode (100) attached to the separator (300), attached is adhesive material. The area for attachment of the adhesive material is presented by the area of oblique lines in FIG. 4(B).

Finally, as is illustrated by FIG. 4(C), the anode (100) with adhesive material attached is place at the bottom layer, and alternately stacked thereon are a plurality of cathodes (200) attached on the separator (300) with adhesive material attached, and anodes (100) attached on the separator (300) with adhesive material attached. Stacking as such completes the manufacturing of stack cell of a lithium battery as shown in FIG. 4(D).

Figure 5:
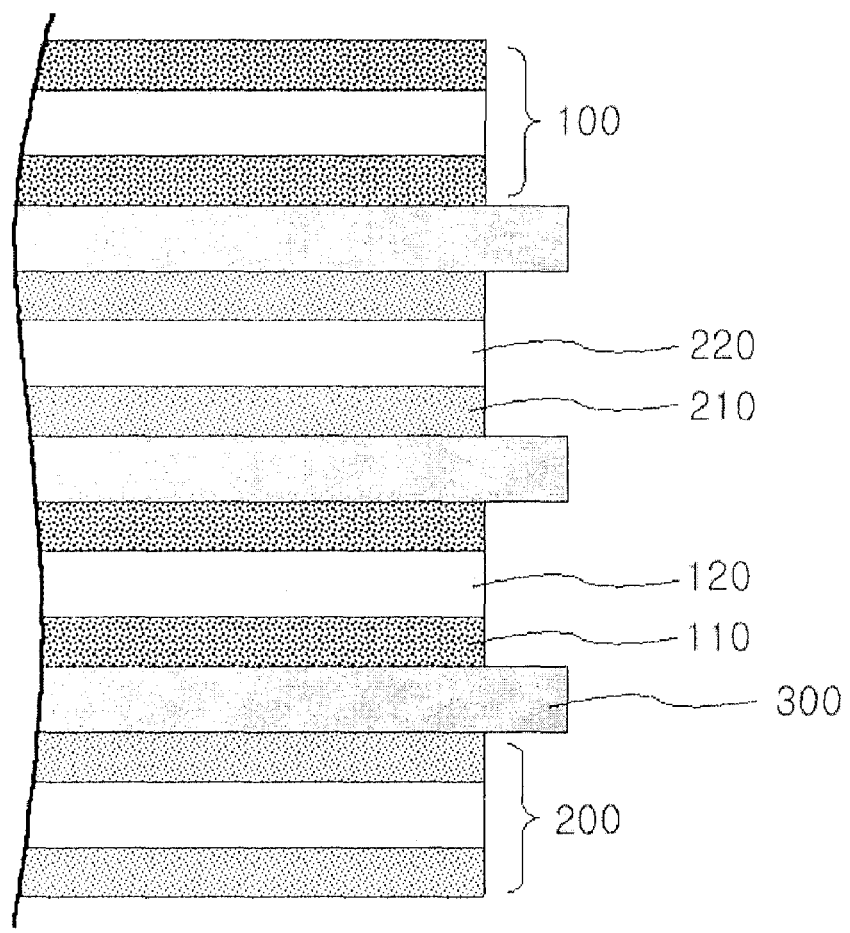
FIG. 5 shows the cross-sectional view of a lithium battery manufactured according to the present invention.

FIG. 5 is a cross-sectional view of the stack cell of a lithium battery thus manufactured. According to the invention, anodes (100) and cathodes (200) are manufactured in an identical dimension, and then attached to separators (300) having identical dimension at the same position, and these electrodes (100, 200) attached to the separators are alternately stacked to form a stack cell. Thus, the electrodes (100, 200) are aligned with consequence of simply aligning the separators (300). Accordingly, various problems caused by errors in alignment can be fundamentally eliminated.

The present invention is not restricted to the embodiments described above, but broadly applied in various field of industry. It is appreciated that a person having ordinary skill in the art to which the invention belongs can make a variety of alteration or modification of the invention without departing from the gist of the present invention claimed by the appended claims.

The invention claimed is:

1. A process for stacking a high-power lithium battery comprising anodes, separators, and cathodes, the process comprising:
   providing an anode attached to a first separator;
   providing a cathode attached to a second separator;
   storing the anode attached to the first separator in a first cartridge;
   storing the cathode attached to the second separator in a second cartridge;
   discharging the anode and the cathode through the first cartridge and the second cartridge; and
   alternately stacking the cathode attached to the second separator and the anode attached to the first separator to form a stack cell.

2. A process for stacking a high-power lithium battery according to claim 1, wherein the anode comprises a first metal film coated with a first lubricant material on a portion of both sides, and wherein the providing an anode further comprises:
   attaching adhesive material to a non-coated portion of one side of each of a plurality of anodes, wherein the non-coated portion is not coated with the first lubricant material;
   attaching the plurality of anodes with the adhesive material attached, onto the first separator such that each of the plurality of anodes is separated from each other; and
   cutting the first separator with the plurality of anodes, attached, in each unit of the anodes.

3. A process for stacking a high-power lithium battery according to claim 1, wherein the first metal film is made of copper.

4. A process for stacking a high-power lithium battery according to claim 1, wherein the cathode comprises a second metal film coated with a second lubricant material on a portion of both sides, and wherein the providing a cathode further comprises:
   attaching an adhesive material to a non-coated portion of one side of each of a plurality of cathodes, wherein the non-coated portion is not coated with a second lubricant material;
   attaching the plurality of cathodes with the adhesive material attached, onto the second separator such that each of the plurality of cathodes is separated from each other; and
   cutting the second separator with the plurality of cathodes attached, in each unit of the cathodes.

5. A process for stacking a high-power lithium battery according to claim 4, wherein the second metal film is made of aluminum.

6. A process for stacking a high-power lithium battery according to claim 1, wherein the alternately stacking further comprises:
   storing an anode not attached to a separator in a third cartridge;
   discharging the anode not attached to the separator through the third cartridge, and after disposing the anode in a lowest layer, attaching the adhesive material onto the anode not attached to the separator;
   stacking the cathode attached to the second separator on the anode not attached to the separator, and attaching the adhesive material onto the cathode attached to the second separator;
   stacking the anode attached to the first separator on the cathode attached to the second separator, and attaching the adhesive material onto the anode attached to the first separator; and
   stacking another cathode attached to the second separator on the anode attached to the first separator, and attaching the adhesive material onto the another cathode attached to the second separator.

7. A process for stacking a high-power lithium battery according to claim 2, wherein the adhesive material is adhesive means including an adhesive agent or adhesive tape.

8. A process for stacking a high-power lithium battery according to claim 4, wherein the adhesive material is adhesive means including an adhesive agent or adhesive tape.

9. A process for stacking a high-power lithium battery according to claim 6, wherein the adhesive material is adhesive means including an adhesive agent or adhesive tape.

10. A process for stacking a high-power lithium battery according to claim 2, wherein the cutting the first separator with the anode attached comprises cutting the first separator with the anode attached using heat cutting.

11. A process for stacking a high-power lithium battery according to claim 4, wherein the cutting the second separator with the cathode attached comprises cutting the second separator with the cathode attached using heat cutting.

* * * * *